Aug. 12, 1930.                K. ADAMS                1,772,590

LIFTING DEVICE FOR VEHICLES

Filed April 15, 1927

INVENTOR
Kempton Adams
BY
Marshall & Hawley
ATTORNEYS.

Patented Aug. 12, 1930

1,772,590

UNITED STATES PATENT OFFICE

KEMPTON ADAMS, OF REDDING RIDGE, CONNECTICUT

LIFTING DEVICE FOR VEHICLES

Application filed April 15, 1927. Serial No. 183,938.

This invention relates to a lifting device for vehicles.

It is a well known fact that the usual automobile lifting jack is difficult and unwieldy to manipulate.

This invention relates to a device so constructed and arranged that the vehicle will be lifted by its own power and the invention has for its salient object to provide a simple and practical device for accomplishing this end in such a manner that no manual manipulation of the device is necessary to lift or lower the vehicle.

Further objects of the invention will appear from the following specification taken in connection with the drawings, which form a part of this application, and in which—

Figure 1:
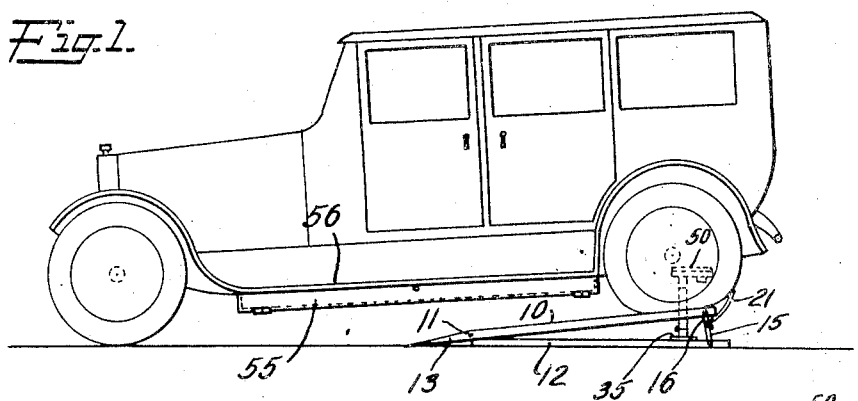
Fig. 1 is an elevation illustrating a vehicle having its rear axle lifted by a device constructed in accordance with the invention.

The invention briefly described consists of a lifting device comprising two essential parts, namely, an inclined track adapted to support the wheel of the vehicle and to raise the wheel as the wheel travels upwardly on the track, and a pedestal or support adapted to support the vehicle axle after the track has been automatically lowered. The track is supported in raised position by a toggle and a trip device is provided for automatically breaking the toggle when the wheel on the track reaches a position in which the axle is disposed above the pedestal. Further details of the invention will appear from the following description.

In the embodiment of the invention illustrated, there is shown a track 10 hinged at 11 to a base 12 and having an inclined extension 13 extending beyond the pivotal hinge 11.

At its end, opposite the pivot end, the track is adapted to be supported by two sets of toggle links 15 and 16 pivoted respectively to the base 12 at 17 and to the free end of the track 10 at 18.

Trip mechanism is provided for breaking the toggle when the wheel reaches a position in which the axle is disposed above the pedestal on which it is to be supported. This mechanism comprises a pair of arms 20 and 21 pivoted on a rod 22 carried by the toggle mechanism 16 and connected at their upper ends by a rod 23. Each of the links 16 has a stop 25 for limiting the pivotal movement of the arms 20, 21 in one direction.

The base 12 in the form of the invention shown is channel shaped and has detachably secured to one side thereof by any suitable means, such as a cotter-pin 30, a base 35 for the pedestal or post on which the axle is to be supported.

Base 35 has projecting upwardly therefrom a stud 36 on which is mounted the lower section 37 of a post which comprises sections 37 and 38 hingedly connected at 39. The section 37 has a stud 40 extending upwardly therefrom and adapted to enter a socket 41 formed in the lower end of the section 38. Any suitable form of catch or securing means may be provided for securing the stud 40 in the socket 41, and in the form of the invention shown, a cotter-pin 45 extends through the lower end of the section 38 and through the socket and stud.

A head 50 is mounted on the upper end of the section 38 and is provided with a pair of bosses 51 and 52, the boss 51 being longer than the boss 52. Each of the bosses has formed therein a recess or pocket 53 adapted to receive a stud 54 projecting upwardly from the section 38. It will be evident that the head 50 will be disposed higher when the stud 54 enters the boss 51 than when it enters the boss 52. The purpose of this is to accommodate the supporting pedestal to different heights of axles. For instance, on an automobile the front axle is lower than the rear axle.

Figure 2:
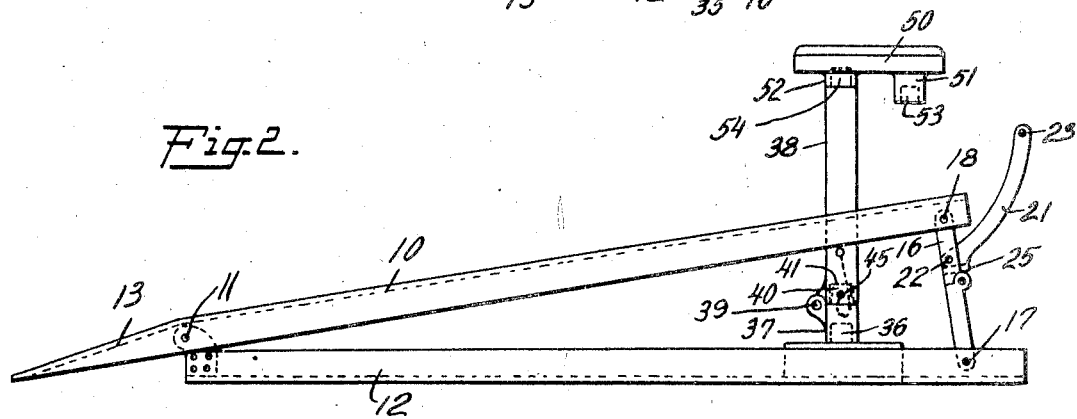
Fig. 2 is a side elevational view of the device in operative position.

The device operates in the following manner. Assuming that the vehicle has a flat tire on one of the rear wheels, the device is opened up to the position shown in Fig. 2 and is placed in back of the vehicle in alinement with the rear wheel to be elevated. The vehicle is then backed and the wheel rolls upwardly on the track 10 to the position shown in Fig. 1. A further backing movement will cause the tire to engage the cross rod 23 of the trip mechanism and break the toggle formed by the links 15 and 16, whereupon the track 10 will drop and the rear axle will rest at one end on the head 50 and be supported thereby. The flat tire can then be removed and replaced. After the repair has been made the vehicle can be given a slight forward movement, whereupon the section 38 of the pedestal will swing on its pivot 39, causing the axle to ride off the head 50.

Figure 3:
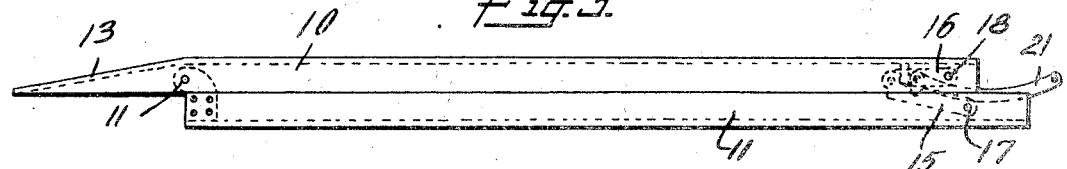
Fig. 3 illustrates the device in folded position.
Figures 4, 5:
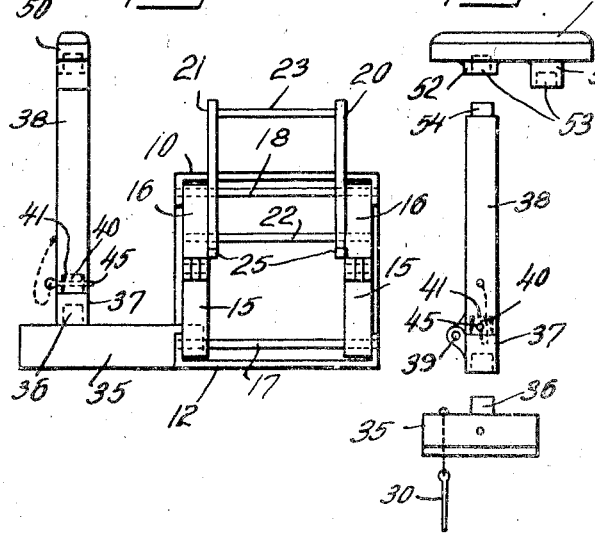
Fig. 4 is an end elevation of the device.
Fig. 5 is an elevational view showing the different parts of the axle supporting device.
Figure 6:
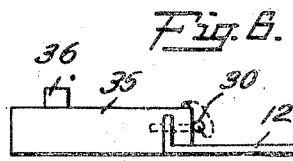
Fig. 6 is an elevational view showing the manner of securing the parts in operative position.

When the device is not in use the parts can be folded to the position shown in Fig. 3 and the three parts of the pedestal can be separated and placed between the track 10 and the base 12. The device can then be placed in a compartment 55 formed beneath one of the running boards 56 of the vehicle, or can be carried in any other suitable space provided therefor.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A lifting device comprising a track, toggle means for supporting the track in inclined position, a pedestal adjacent one end of the track, and trip means disposed beyond said end of the track for tripping the toggle and releasing the track supporting means.

2. A lifting device comprising a hinged track, toggle means for supporting the track in inclined position, a pedestal adjacent one end of the track, and trip means disposed beyond said end of the track for tripping the toggle and releasing the track supporting means.

3. A lifting device comprising a base, a track hinged adjacent one end thereto and adapted to fold flat against the base, toggle mechanism connected to the base and track and adapted to support the track in inclined position on the base, a trip disposed beyond the raised end of the track when the track is in inclined position, and rigid supporting means detachably connected to the base and adapted to engage the wheel axle when the toggle is released.

4. A lifting device comprising a base, a track hinged adjacent one end thereto, toggle links connected to the track and to the base adjacent the other end thereof, said toggle links being adapted to support the track in inclined position, means connected to the toggle links and disposed in the path of movement of a wheel on the track when the track is inclined for breaking the toggle and permitting the track to drop away from wheel supporting position, and a support engageable by the wheel axle when the track is lowered for supporting the axle when the toggle is broken, said toggle breaking means being movable out of the path of the wheel and axle when the toggle is broken.

5. A lifting device comprising a base, a track hinged adjacent one end thereto, toggle links connected to the track adjacent the other end thereof and to the base, said toggle means being adapted to support the track in inclined position, said means being disposed beyond the end of the track, means adapted to be engaged by a wheel on said track for breaking the toggle and releasing the track from supporting position, and means separate from the track engageable with the wheel axle for supporting the axle when the toggle is broken.

6. A lifting device comprising a base, a track hinged adjacent one end thereto, toggle links connected to the track and to the base adjacent the other end thereof, said toggle links being adapted to support the track in inclined position, means connected to the toggle links and disposed beyond the end of the track in the path of movement of a wheel on the track when the track is inclined for breaking the toggle and permitting the track to drop away from wheel supporting position, and a support engageable by the wheel axle when the track is lowered for supporting the axle when the toggle is broken.

7. A lifting device comprising a base, a track hinged adjacent one end thereto, toggle links connected to the track and to the base adjacent the other end thereof, said toggle links being adapted to support the track in inclined position, means connected to the toggle links and disposed beyond the end of the track in the path of movement of a wheel on the track when the track is inclined for breaking the toggle and permitting the track to drop away from wheel supporting position, and a support engageable by the wheel axle when the track is lowered for supporting the axle when the toggle is broken, said toggle breaking means being movable out of the path of the wheel and axle when the toggle is broken.

In witness whereof, I have hereunto set my hand this 14th day of April, 1927.

KEMPTON ADAMS.